United States Patent
Kitamura et al.

(10) Patent No.: US 7,222,168 B2
(45) Date of Patent: May 22, 2007

(54) COMPUTER SYSTEM (75) Inventors: Manabu Kitamura, Cupertino, CA (US); Yoji Nakatani, Yamato (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 384 days.

(21) Appl. No.: 10/673,195

(22) Filed: Sep. 30, 2003

(65) Prior Publication Data

US 2005/0044163 A1 Feb. 24, 2005

(30) Foreign Application Priority Data

Aug. 4, 2003 (JP) .............................. 2003-205616

(51) Int. Cl.
*G06F 15/173* (2006.01)

(52) U.S. Cl. ..................... 709/223; 709/224; 707/204; 711/162

(58) Field of Classification Search ........ 709/223–224; 707/10, 204, 205; 714/5–6
See application file for complete search history.

(56) References Cited

U.S. PATENT DOCUMENTS

| | | | | |
|---|---|---|---|---|
| 5,537,585 | A * | 7/1996 | Blickenstaff et al. | 707/205 |
| 6,000,020 | A | 12/1999 | Chin et al. | |
| 6,260,069 | B1 * | 7/2001 | Anglin | 709/229 |
| 6,269,381 | B1 * | 7/2001 | St. Pierre et al. | 707/202 |
| 6,460,055 | B1 * | 10/2002 | Midgley et al. | 707/204 |
| 6,526,418 | B1 * | 2/2003 | Midgley et al. | 707/204 |
| 6,604,118 | B2 | 8/2003 | Kleiman et al. | |
| 6,886,086 | B2 * | 4/2005 | Kobayashi et al. | 711/162 |
| 2003/0212870 | A1 | 11/2003 | Nowakowski | |
| 2003/0221075 | A1 * | 11/2003 | Achiwa et al. | 711/162 |
| 2004/0073677 | A1 | 4/2004 | Honma et al. | |
| 2004/0167972 | A1 | 8/2004 | Demmon | |

FOREIGN PATENT DOCUMENTS

| | | |
|---|---|---|
| JP | 2002-007304 A | 1/2002 |
| JP | 2002041345 | 2/2002 |

OTHER PUBLICATIONS

U.S. Appl. No. 09/606,050.
O'Reilly Japan, Inc., "SAN & NAS Storage Network Management", pp. 193-221 (with English Version pp. 162-188).

* cited by examiner

*Primary Examiner*—Ario Etienne
*Assistant Examiner*—LaShonda Jacobs
(74) *Attorney, Agent, or Firm*—Mattingly, Stanger, Malur & Brundidge, P.C.

(57) ABSTRACT

A system for performing efficient backup in an environment where a plurality of file servers exist, making the plurality of file servers externally look like a single apparatus. The present invention provides a computer system comprising hosts, first and second file servers connected to the hosts, and a storage system connected to the first and second file servers. The second file server determines that a file as a backup object is managed by the first file server, and notifies the first file server of an instruction of backup. In response to this instruction, the first server sends the second file server an identifier of a storage device that stores duplicate data of the file in question. Based on the received identifier, the second file server sets a path to that storage device, and obtains the backup data from that storage device.

13 Claims, 6 Drawing Sheets

FIG.10

COMPUTER SYSTEM

BACKGROUND OF THE INVENTION

The present invention relates to a backup technique in a computer system.

Recently, as data amount increases, a computer system used in a company or the like becomes larger in its scale. However, when an additional storage apparatus is provided, backup work becomes complex and expensive. For example, a backup apparatus should be provided for each computer, to perform backup processing. Thus, it is considered for example that host computers (hereinafter, simply referred to as hosts), a storage system and a tape device are connected to a network called SAN (Storage Area Network), and data of all the storage apparatuses are backed up in a batch by a server (hereinafter, referred to as a backup server) used exclusively for backup processing. For example, Japanese Patent Application Laid-Open No. 2002-7304 discloses a method in which data in a storage apparatus used by another server connected to a SAN are backed up by a backup server into a tape device and a method in which a plurality of hosts shares the tape device. As a result, backup can be performed without loading a server that is executing ordinary service, and construction costs of a computer system can be reduced.

Further, there is widely used an apparatus called NAS (Network Attached Storage) that is connected to a LAN (Local Area Network) interconnecting a plurality of hosts. NAS is an apparatus that serves hosts with data access using a network file access protocol such as NFS (Network File System), CIFS (Common Internet File System) or the like, and comprises a storage part for storing files and a NAS head part (hereinafter, referred to as a file server) for processing a file access request from a host. NAS is easy in data sharing by a plurality of hosts and in setting operation, and accordingly, even a medium or large scale site comes to employ a NAS, and there appears some apparatus having a plurality of file servers to increase performance and reliability.

In many cases, each maker of a NAS for business use employs an original OS and an original file system for the sake of high performance and high reliability, and thus it is very difficult to install backup software that sells on the market and that can be used in an ordinary host. As a result, generally, a method using NDMP (Network Data Management Protocol) is employed to perform backup. NDMP is a protocol for backup processing between a NAS apparatus and an external apparatus having backup software. In the case of an NDMP-capable NAS apparatus, backup operation and restoring operation can be performed from an apparatus that has backup software adapted for NDMP. In other words, one apparatus having backup software can perform backup operation for NASs of various makers. Thus, NDMP is a de facto standard. O'Reilly Japan, Inc., "SAN & NAS storage network management", pp. 193–221 discloses some NAS backup methods using NDMP.

SUMMARY OF THE INVENTION

In backup of a NAS, a file server reads data stored in a storage apparatus, generates a backup format unique to that NAS, and sends the generated backup format to a tape device connected directly to a backup server or the NAS. As a result, load on a CPU of the file server is increased in the course of backup processing, affecting the online service. Further, in the case of an apparatus having a plurality of file servers, the apparatus is recognized as a plurality of NASs from an external apparatus, particularly from the backup server, although the apparatus is in fact a single NAS. This complicates the management.

An object of the present invention is to provide a system that performs backup processing efficiently in an environment where a plurality of file server exist, while making the plurality of file servers look like a single apparatus from an external apparatus.

To solve the above problems, the present invention provides a computer system comprising hosts, first and second file servers connected to the hosts, and a storage system connected to the first and second file servers.

The second file server notifies the first file server of an instruction of backup. In response to this instruction, the first server sends the second file server an identifier of a storage device that stores duplicate data of a file as a backup object. Based on the received identifier, the second file server sets a path to that storage device, and obtains the backup data from that storage device.

DESCRIPTION OF THE PREFERRED EMBODIMENTS

[First Embodiment]

Figure 1:
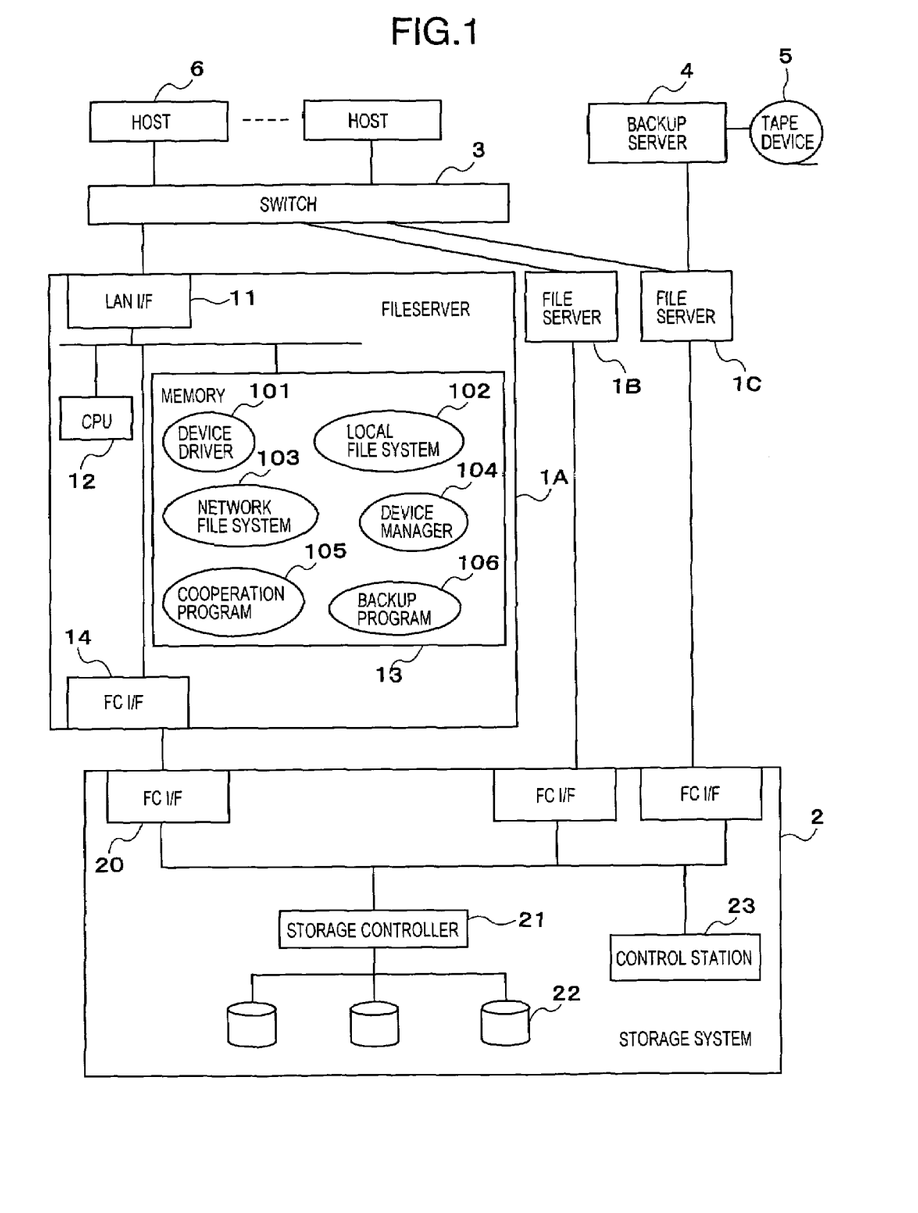
FIG. 1 is a diagram showing an example of a configuration of a computer system.

FIG. 1 is a diagram showing an example of a configuration of a computer system of the present invention. In the figure, each piece of software is shown being encircled by an ellipse.

The computer system comprises file servers 1A, 1B and 1C, a storage system 2, a switch 3, a backup server 4, a tape device 5, and hosts 6. In the following, the file servers 1A, 1B and 1C are referred to as a file server 1 representatively. The file servers 1 and the storage system 2 may be integrated to be a NAS apparatus. In that case, there may be an internal switch for connecting the file servers in the NAS apparatus.

Each file server 1 comprises a network interface (abbreviated as LAN I/F) 11, a CPU 12, a memory 13 and an a Fibre Channel interface (abbreviated as FC I/F) 14. The file servers 1 are connected to the switch 3 through the respective LAN I/F 11, and provide file access service by NFS or CIFS to a host 6 connected to the switch 3. The file server 1C is also connected to the backup server 4 through the LAN I/F 11.

The memory 13 stores programs such as a device driver 101, a local file system 102, a network file system 103, a device manager 104, a cooperation program 105, a backup program 106, and the like. The device driver 101 is a program for accessing the storage system 2. The local file system 102 is a program for accessing a below-mentioned file system. The network file system 103 is a program for processing an access request sent from a host 6 in compliance with a file access protocol (such as NFS, CIFS or the like). The device manager 104 is a program for duplicating data of a storage device 22 into another storage device 22, and for obtaining information from each storage device 22, for example. The cooperation program 105 is a program for performing backup in cooperation with an apparatus that performs backup. The backup program 106 is a program for performing back up in a batch, in communication with other apparatuses that execute the cooperation program 105.

Here, the backup server 4 may directly connect with the switch 3 or with all the file servers 1. In that case, even when a failure occurs in the file server 1C, either of the file servers 1A and 1B can take the place of the file server 1C to perform backup. Or, it is possible to employ a form in which one server is kept in an idle state as a standby server, and when a failure occurs in another file server, the standby server takes over the processing of the faulty server. At that time, the standby server can dedicatedly perform backup processing without affecting the ordinary service.

In the present embodiment, the file server 1C performs backup instead of the file servers 1A and 1B. It is, however, possible that when a failure occurs in the file server 1C, either of the file servers 1A and 1B performs backup instead of the file server 1C. Accordingly, each file server has the backup program 106. Similarly, it is possible that when a failure occurs in the backup function of the file server 1C, either of the file servers 1A and 1B takes over the backup. Accordingly, each file server has the cooperation program 105.

The storage system 2 comprises FC I/Fs 20, a storage controller 21, a plurality of storage devices 22 and a control station 23. The storage system 2 is connected to the file servers 1 through respective FC I/Fs 20. The storage controller 21 has a function of generating duplicated data of the storage devices 22 (hereinafter, referred to as a disk mirror/split function, which corresponds to the volume copy function described in the Japanese patent Application Laid-open No. 2002-7304). The control station 23 may exist outside the storage system 2. Further, each of the storage devices 22 may be a physical magnetic disk drive, or may take a form of one logical disk drive consisting of a plurality of magnetic disk drives such as a disk array device, or may be a device using another medium such as an optical medium.

The backup server 4 is connected not only to the file server 1C but also to the tape device 5, to back up data sent from the file server 1C into the tape device 5. Here, the file server 1C and the tape device 5 may be connected with each other through the FC I/F, to perform backup not through the backup server 4.

Usually, a file server that accesses a certain storage device 22 is uniquely determined, and accordingly, each storage device 22 is set such that only one file server can access that storage device 22. However, it is possible that a certain storage device 22 can be accessed from a plurality of file servers. In the following, setting processing to make a file server capable of accessing a certain storage device 22 is referred to as path setting.

Figure 2:
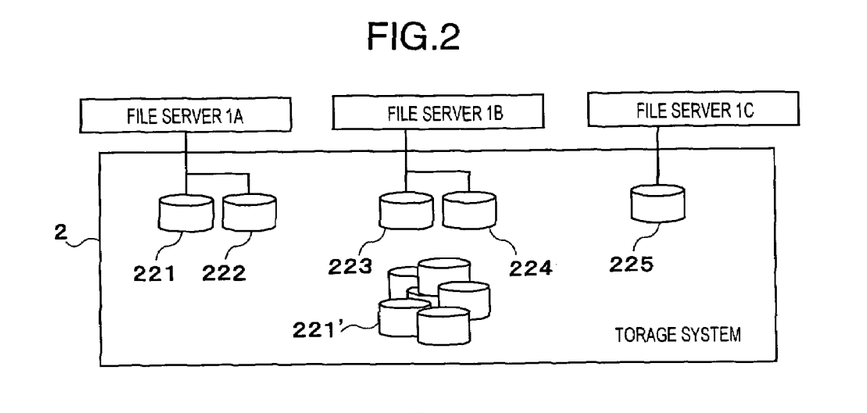
FIG. 2 is a diagram showing an example of a logical configuration of a storage system.

FIG. 2 is a diagram showing an example of a logical configuration of the storage system 2. In this example, storage devices 221 and 222 are logically set with a path to the file server 1A, storage devices 223 and 224 to the file server 1B, and a storage device 225 to the file server 1C. Further, the storage system 2 keeps unused storage devices 221' (a pool volume). When necessary, the storage devices 221' are set with paths to a file server 1, to store duplicated data. One of the file servers 1 may manage the storage devices 221', or an administrator may manage the storage devices 221' through the control station 23.

Figure 3:
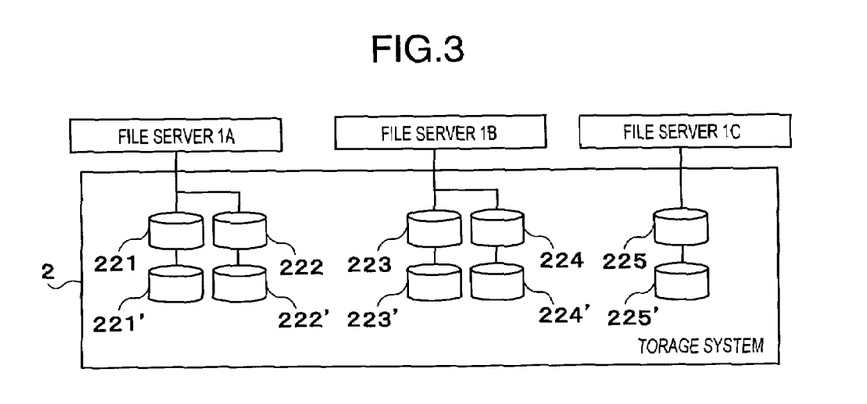
FIG. 3 is a diagram showing another example of logical configuration of the storage system than the one shown in FIG. 2.

FIG. 3 is a diagram showing another example of logical configuration of the storage system than the one shown in FIG. 2. Although the connecting relations in this example are similar to FIG. 2, storage devices 221' to 225' store duplicated data of the respective storage devices 221 to 225 through the disk mirror/split function of the storage controller 21.

Figure 4:
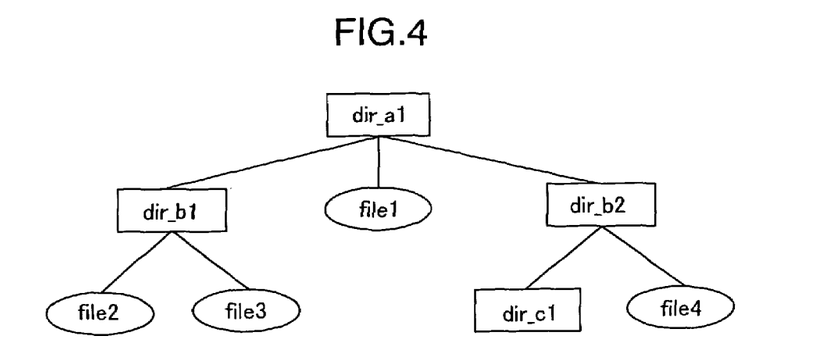
FIG. 4 is a diagram showing a hierarchical directory structure of a file system.

FIG. 4 is a diagram showing a hierarchical directory structure of a file system managed by a file server 1. The hierarchical directory structure means such structure that a plurality of files or directories exist under a root directory dir_al as the vertex. In the following, the files and directories belonging to hierarchical directory structure and a set of pieces of attribute information constituting the structure are referred to as a file system. One file system may spread over a plurality of storage devices, or a plurality of file systems may exist in one storage device. For the sake of simplicity, the present embodiment assumes that one file system exists in one storage device.

Figure 5:
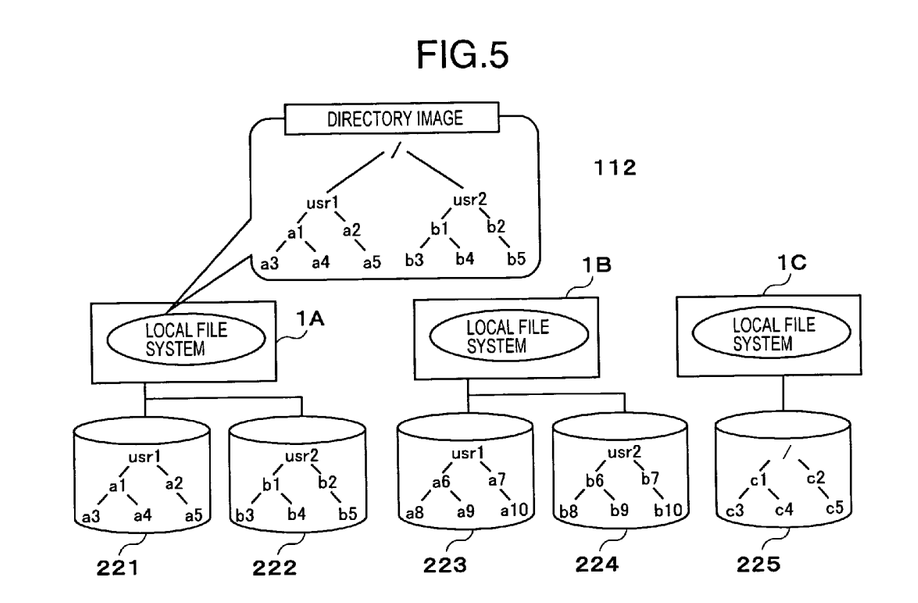
FIG. 5 is a diagram showing a directory image of a file system.

FIG. 5 is a diagram showing contents of file systems managed by the file servers 1. The file server 1A manages one file system in each of the storage devices 221 and 222 shown in FIG. 2 (FIG. 3), naming those file systems usr1 and usr2 respectively. The CPU 12 executes the local file system 102 to manage the file systems such that there are two directories usr1 and usr2 under a root directory "/" as shown in a directory image 112. Similarly, the file server 1B manages one file system in each of the storage devices 223 and 224 shown in FIG. 2 (FIG. 3), and manages these two file systems under a root directory "/". Further, the file server 1C manages one file system in the storage device 225 shown in FIG. 2 (FIG. 3) and manages this file system under a root directory "/". This is a form of an ordinary file system managed by an ordinary file server.

Next, will be described three functions provided by execution of the device manager 104.

The first function is a function of path setting. Path setting is performed based on an instruction given from the CPU 12 or the control station 23 to the storage system 2. Each of the storage devices 22 is given with an identifier that is unique within the storage system 2 (for example, the storage device 221 of FIG. 2 is given with the identifier "number 221"). And, to set a path, the CPU 12 or the control station 23 designates an identifier. In FIG. 2 showing an initial state, the file server 1A is set with paths to the storage devices 221 and 222, the file server 1B is set with paths to the storage devices 223 and 224, and the file server 1C is set with a path to the storage device 225. An identifier may be given to a physical storage device or to a logical storage device.

The second function is a function of activating the disk mirror/split function of the storage controller 21, to duplicate data stored in a certain device among the storage devices 22 into another storage device 22. For example, the CPU 12 designates identifiers of the copy source and the copy destination so that data (a snapshot image) of the storage device 221 at the time when a duplicate data generation instruction is given are duplicated into the storage devices 221'.

Figure 6:
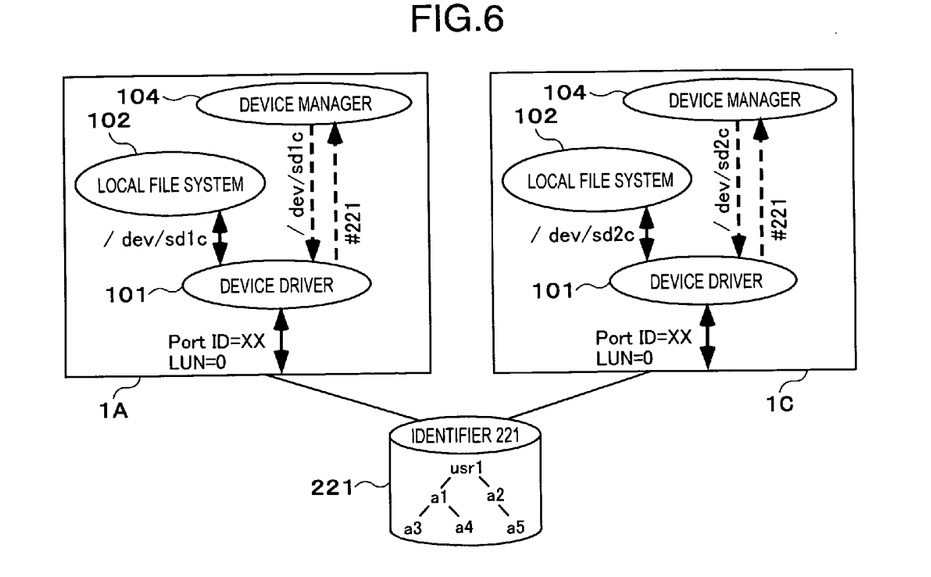
FIG. 6 is a diagram showing a flow of information in the case where a file server 1 accesses a storage device 221.

The third function is a function of obtaining information unique to each storage device 22 from that storage device 22. FIG. 6 is a diagram showing information used for access of the file servers 1A and 1C to the storage device 221 in the case where the storage device 221 is set with paths to the file servers 1A and 1C. In the following, for the sake of convenience, a part of description is given taking a program as a subject of operation, although, in fact, the CPU 12 is the subject of the operation.

In the case where the CPU 12 executes the local file system 102 to access a file system in the storage device 221, an access request to the storage device 221 is processed by executing the device driver 101. At that time, the device driver 101 receives a kind of file name called a device file name from the local file system 102, to specify the storage device as the access object. In the example shown in FIG. 6, the file server 1A associates the storage device 221 with a device file name "/dev/sd1c". Thus, when the device driver 101 is executed, the local file system 102 delivers "/dev/sd1c" as a parameter, for specifying the storage device 221 as the access object. Information associating a device file name with a file system name is stored, for example, in /etc/fstab i.e. a setting file owned by the file server 1. This setting file may be stored in the memory 13 or in a storage device for storing a setting file, which is different from a storage device for storing user data.

Device file names are managed by each of the file servers 1A and 1C, and their naming is performed independently of each other (there is no definite rule of this naming). It is possible that the file server A1 associates "/dev/sd1c" with the storage device 221 while the file server 1C associates "/dev/sd2c". Further, the local file system 102 in the file server 1A designates this "/dev/sd1c" to generate an access request, and delivers the access request to the device driver 101. The device driver 101 translates the received device file name into a port ID and a logical unit number (LUN), and issues an access instruction including the port ID and LUN as parameters to the storage system 2, to access the storage device 221. Here, a port ID is dynamically assigned to each physical interface in the initialization phase (a user or the administrator can not determine a port ID at will), and a LUN is determined by the administrator through the control station 23 at the time of setting a path, or by the CPU 12 executing the device manager 104. However, it is not assured that the same LUN is always assigned to the storage device 221 when the file server 1A accesses the storage device 221 and when the file server 1C accesses the storage device 221. As a result, when it is desired that the file server 1C accesses the storage device 221 that has been accessed from the file server 1A, it is not assured that the file server 1C can access the storage device 221 even if the file server 1C is informed of the device file name "/dev/sd1c" used by the file server 1A and the file server 1C uses that file name "/dev/sd1c".

Accordingly, the present embodiment specifies a storage device by utilizing the fact that each storage device has a unique identifier. For example, when the storage device to which the directory "/usr1" belongs is to be specified, the file server 1A uses the device manager 104 to issue an instruction to obtain the identifier of the storage device 221. At that time, the device manager 104 gives an instruction to the device driver 101, designating the device file name "/dev/sd1c". The device driver 101 translates "/dev/sd1c" into information of a pair of a port ID and a LUN, and sends the storage system 2 an instruction to obtain the identifier of the storage device corresponding to the pair of the port ID and the LUN. In response to the instruction, the storage system 2 sends the identifier "221" of the storage device 221 to the file server 1A. As an example of a method of sending an identifier, there may be a method in which the storage system 2 inserts the identifier of the storage device into response information to an INQUIRY command or a MODE SENSE command of SCSI, before sending that response information. Then, the file server 1A sends the received identifier to the file server 1C. On the other hand, on the side of the file server 1C, in order to specify the storage device 221 given with the identifier "221", the device manage 104 is executed to obtain identifiers of all the device files owned by the file server 1C. Then, the device file that returns the identifier "221" received from the file server 1A can be used to access the storage device 221.

Here, each file server associates a device file name with a file system, based on LUN given by a user. Further, in the case where each file server 1 associates a file system with an identifier of a storage device, the file server 1A can send the identifier to the file server 1C without inquiring the identifier of the storage system 2.

Figure 7:
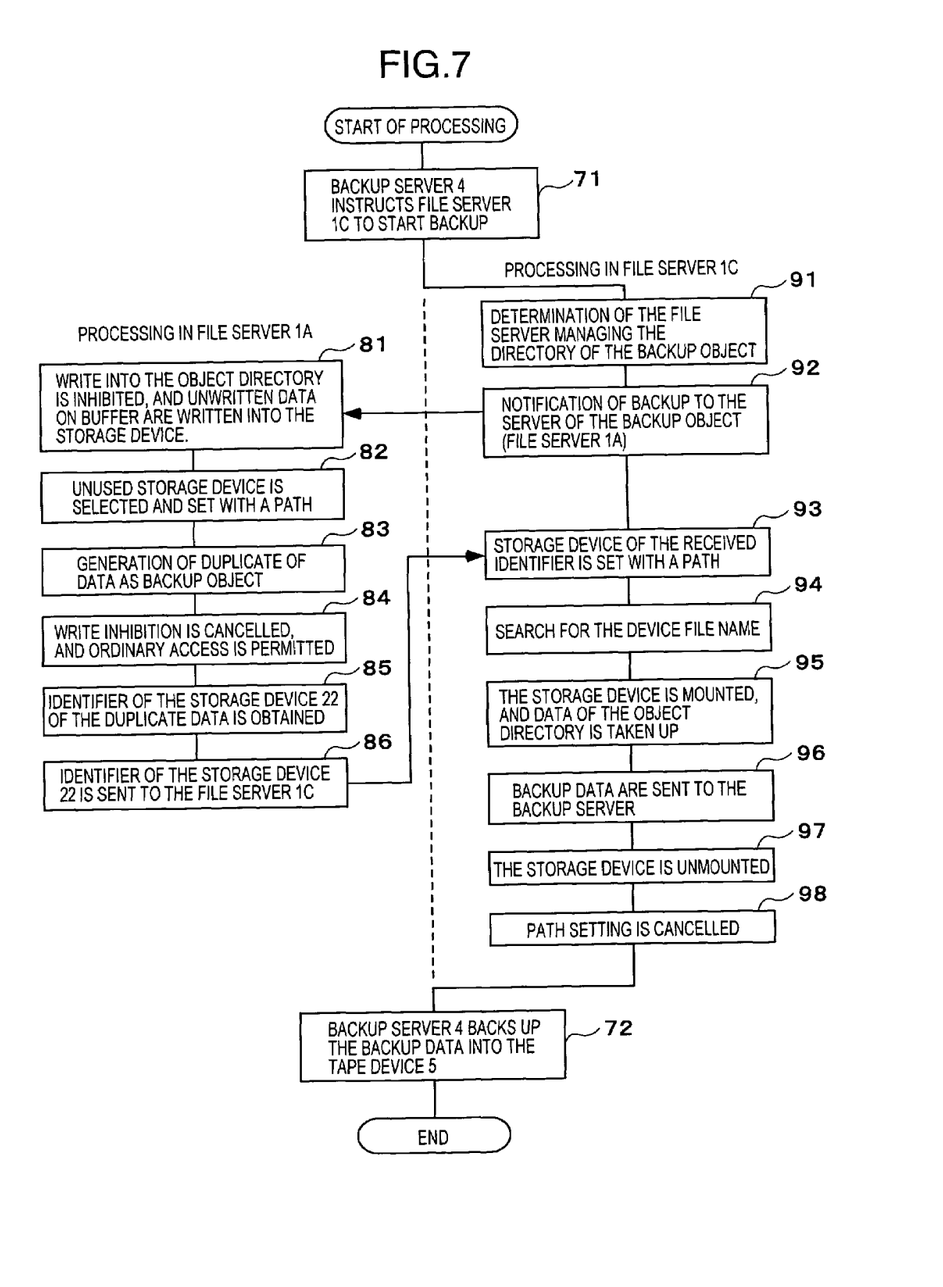
FIG. 7 shows a backup processing flow.

Next, a flow of backup processing will be described referring to FIG. 7. Here, description will be given assuming that, in the form of FIG. 2, the file server 1C receives an instruction to back up the directory /usr1 and downward managed by the file server 1A.

Figure 10:
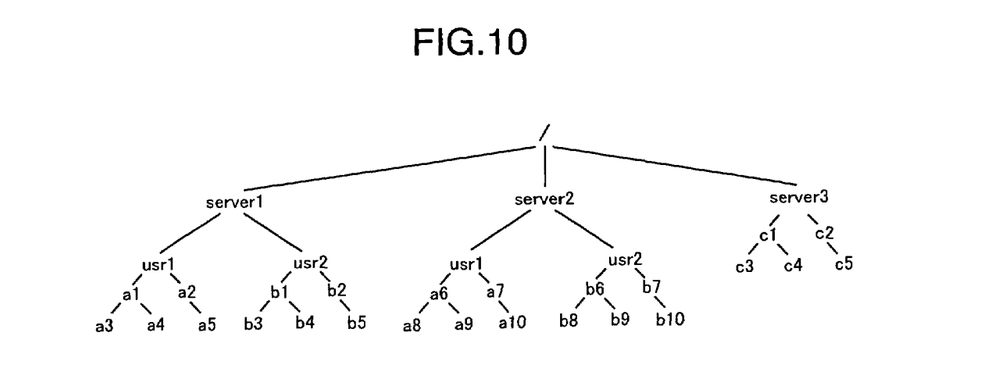
FIG. 10 is a diagram showing a directory structure of a file system that integrates the file server 1.

First, backup processing is started when a user or the administrator informs the backup server 4 of designation of a directory name to which a file to back up belongs. Usually, the backup server 4 gives an instruction of backup to a file server that manages the file or directory as the object of the backup. In the present embodiment, however, the backup server 4 gives every instruction to the file server 1C. The file server 1C makes its file system externally look like one having the directory structure shown in FIG. 10. Thus, the backup server 4 designates the directory name "/server1/usr1".

Next, the backup server 4 informs the file server 1C of that directory name, and instructs the file server 1C to start backup (Step 71). Receiving the instruction, the file server 1C executes the backup program 106, and, based on the directory name "/server1/usr1", determines that the backup object directory is managed by the file server 1A (Step 91). Then, the file server 1C notifies the file server 1A to the effect that backup of the directory "/usr1" will be performed (Step 92).

Next, receiving the notification, the file server 1A executes the local file system 102 so that write operation into /usr1 from the network file system 103 is stopped temporarily, and, when a buffer keeps data to be written into the storage device 221, all such data are written into the storage device 221 (Step 81). Here, the buffer may be a part of the memory 13, or may exist in the file server separately from the memory 13. Then, an unused storage device is selected from the storage devices 221', and a path is set to the selected storage device (Step 82). Then, the device manager 104 is executed to give an instruction to the storage system 2 to duplicate the data of the storage device 221 into the selected storage device 221'. The storage system 2 use the disk mirror/split function to duplicate the data (a snapshot image) of the storage device 221 at the time of receiving the instruction from the file server 1A into the selected storage device 221' (Step 83). Then, the file server 1A cancels the inhibition in Step 81 of the write operation into /usr1, and executes the network file system 103 to permit ordinary access (Step 84).

The reason why, in Step 81, the write operation into /usr1 is inhibited and the data in the buffer are written into the storage device 221 is as follows. First, the data in the buffer are written out because the file server 1C takes up contents of the storage device 221' to back up them, and, when data to be written remain in the buffer of the file server 1A, those data in the buffer of the file server 1A can not be read out from the file server 1C (Writing of data into the storage device 221' is performed by the disk mirror/split function, and thus, the file server 1A does not consider write into the storage device 221'). Next, write into /usr1 is inhibited because, even when new data come in the middle of writing the data in the buffer into the storage device 221, it should be avoided that data contents newer than the time of the backup instruction are written into the storage device. Or, in the case where it is desired to simultaneously back up file systems respectively stored in the storage devices 221 and 222 for example (namely, a plurality of file systems are backed up simultaneously), write operation is inhibited because data written into the storage device 221' and data written into the storage device 222' should be of the same point of time.

The file server 1A executes the device manager 104 to obtain the identifier of the storage device 221' (the storage device that stores the duplicate data) from the storage system 2 (Step 85), and sends the obtained identifier to the file server 1C (Step 86).

Based on the identifier sent from the file server 1A, the file server 1C sets a path to the storage device 221' (Step 93), and searches for the device file name that is associated in the file server 1C with the storage device 221' (Step 94). The method of search is as described above referring to FIG. 6. When the device file in question is found, that device file is used to mount the storage device 221' as the object, to take up the data of the object directory (Step 95). Although backup processing is instructed in detail from the backup server 4, generally backup processing is performed by executing a tar command or a dump command. Backup data generated by a tar command or a dump command are sent to the backup server 4 (Step 96). When sending of all the backup data is finished, the storage device 221' in question is unmounted (Step 97), and the path setting of the storage device in question is cancelled (Step 98).

Thereafter, the backup server 4 backs up the data received from the file server 1C into the tape device 5 (Step 72).

In the case of a configuration in which storage devices such as the storage device 221' and so on for storing snap shot data are set with paths in advance as shown in FIG. 3, Steps 82, 93 and 98 can be dispensed with.

Hereinabove, has been described the example where only the data of the file server 1A are backed up. However, directories of backup objects can be designated as "/{server1/usr1}, /{server2/usr2}" to perform backup of data of "/usr1" of the file server 1A and data of "/usr2" of the file server 1B simultaneously. In that case, in Step 92 of FIG. 9, the backup instruction is issued to the file servers 1A and 1B simultaneously, and also the duplication of the data is performed simultaneously. In the case where only one tape device 5 exists, the processing of backing up the data into the tape device 5 is performed by writing the data of the directory /usr1 of the file server 1A and the data of the directory /usr2 of the file server 1B into the tape device 5 in this order (or reversedly). In this sense, simultaneous backup is not possible. However, since the data duplication processing is instructed from the file server 1C to the file servers 1A and 1B simultaneously, duplicate data at the same point of time can be preserved for both the file servers 1A and 1B. In the case where a plurality of tape devices 5 exist, writing of backup data into the tape devices 5 can be performed simultaneously. Further, when the root directory "/" is designated, all the data of the file server 1 (in FIG. 10, the data in the root directory and thereunder) can be backed up. As a result, in the present invention, even when there exist many file servers, backup operation can be performed as if there existed only one file server.

As described above, in the present invention, the file server 1C undertakes burdensome processing of data read from the storage device 221' and data transmission to the backup server 4, and, as a result, backup processing can be performed scarcely loading the file servers 1A and 1B and the network connecting the file servers 1A and 1B with the hosts 6. Further, even when there exist many file servers, backup is performed by giving an instruction only to the file server 1C, a user can perform backup processing as if there existed only one file server (NAS).

[Second Embodiment]

Figure 8:
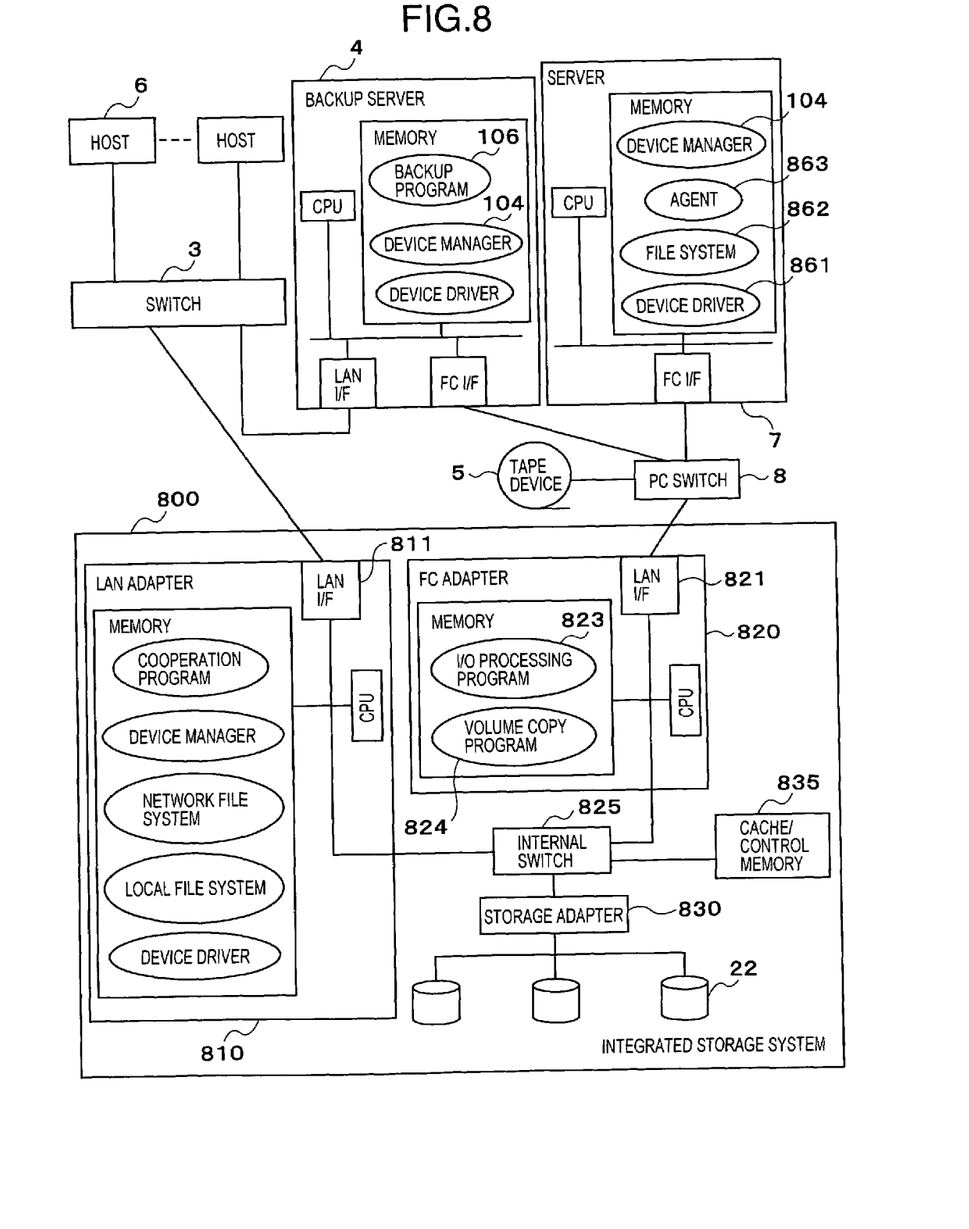
FIG. 8 is a diagram showing an example of a configuration of another computer system than the one of FIG. 1.

FIG. 8 is a diagram showing an example of a configuration of a computer system in a second embodiment. In the configuration of this computer system, a switch 3 connects an integrated storage system 800, one or more hosts 6 and a backup server 4 with one another, and a Fibre Channel switch (abbreviated as FC switch) 8 connects a server 7, the backup server 4, a tape device 5 and the integrated storage system 800 with one another.

The integrated storage system 800 comprises a LAN adapter 810, a FC adapter 820, a storage adapter 830, storage devices 22, an internal switch 825, and a cache/control memory 835. The LAN adapter 810 has a function corresponding to the file servers 1A and 1B in the first embodiment. The FC adapter 820 has an I/O processing program 823 for processing a read/write command from the server 7 or the backup server 4 and a volume copy program 824 for duplicating data of a volume within the integrated storage system 800 into an external storage device, the tape device 5, or the like and for duplicating data of the external storage device or the tape device 5 into a volume within the integrated storage system 800. The storage adapter 830 has a read/write control function concerning the storage devices 22, a function of making a plurality of storage devices 22 look like one or more logical storage devices from a LAN adapter 810 and an FC adapter 820, a disk mirror/split function, and so on. The cache/control memory 835 stores a part of data of the storage devices 22 and data used for communication between the LAN adapter 810, the FC adapter 820 and the storage adapter 830, to realize high speed of access from the server 7 and the LAN adapter 810. Although the figure shows one LAN adapter 810, one FC adapter 820 and one storage adapter 830, each may be a plurality of adapters. The internal switch 825 connects the LAN adapter 810, the FC adapter 820 and the storage adapter 830 with one another. The internal switch 825 may be a crossbar switch or a common bus connecting each adapter with another.

The server 7 stores a device driver 861, file systems 862, agents 863 and a device manager 104. The backup server 4 stores a device driver 861, a device manager 864 and a backup program 106.

Figure 9:
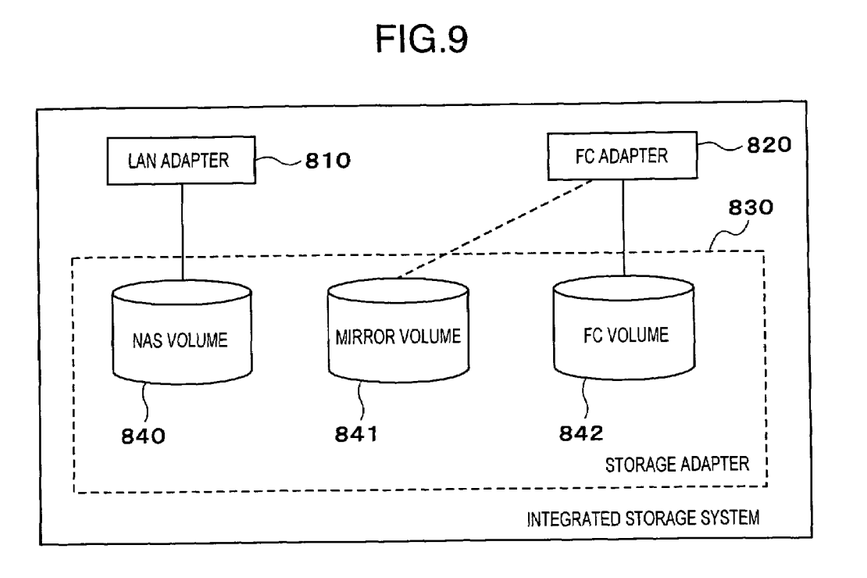
FIG. 9 is a diagram showing an example of a logical configuration of the storage system of FIG. 8.

FIG. 9 is a diagram showing a logical configuration of the integrated storage system 800. The storage adapter 830 combines several storage devices 22 or partitions one storage device 22 to form a NAS volume (i.e., a volume for NAS use) 840, a mirror volume 841 and an FC volume (i.e., a volume for FC use) 842. It is possible to employ a form in which one storage device 22 corresponds to one volume. From the LAN adapter 810 and the server 7, existence of the storage adapter 830 can not be recognized (this is shown by a dotted line in FIG. 9). Although the figure shows one NAS volume 840, one mirror volume 841 and one FC volume 842, each may be a plurality of volumes. The NAS volume 841 is set with a path such that the LAN adapter 810 can access the NAS volume 841. The mirror volume 842 stores duplicate data of the NAS volume 840 or the FC volume 842 owing to the disk mirror/split function. The FC volume 842 is defined such that the server 7 and the backup server 4 can access the FC volume 842 through the FC adapter 820. Further, the mirror volume 841 may be set with a path as the need arises, as in the case of FIG. 2. Or, the mirror volume 841 may be previously set with a path to store duplicate data of the NAS volume, as in the case of FIG. 3. Here, description is given assuming the same form as FIG. 2.

In the second embodiment, backup is performed in the volume level such that a volume image is backed up directly into the tape device 5. Executing the backup program 106, it is possible to back up both volumes under the LAN adapter 810 and volumes under the server 7. To perform backup processing, a user designates a host name (or an IP address) of the server 7 or the LAN adapter 810 that manages the data as the backup object, and also designates a device file name. The backup server 4 performs backup processing while communicating with the server 7 or the LAN adapter 810 based on the information of the designation.

The backup processing in the second embodiment is almost similar to the processing of FIG. 7, and only the difference will be described in the following. First, a user designates the server 7 or the LAN adapter as an apparatus for managing data, and processing corresponding to Step 91 does not exist. To perform backup into the tape device 5, the backup server 4 executes the volume copy program 824 designating the mirror volume 841 as the copy source and the tape device 5 as the copy destination. Further, in Step 85, the identifier of the volume of the duplicate data is obtained. And in Step 86, the identifier of the volume in question is sent to the backup server 4. In Step 93 and thereafter, backup is performed in the volume level, and Steps 95 and 97 corresponding to the mount processing and the unmount processing of the file system do not exist.

As described above, in the second embodiment, the backup server 4 can perform the backup processing of both the NAS volume 840 used by the LAN adapter 810 and the FC volume 842 used by the server 7, together in a batch.

The programs described in the present invention may be moved from a storage medium such as a CD-ROM or may be downloaded from another apparatus through a network.

According to the present invention, in an environment where a plurality of file servers exist, it is possible to provide a system in which backup processing is performed efficiently while making the plurality of file servers externally look like a single apparatus.

What we claim is:

1. A computer system comprising a plurality of computers, a plurality of file servers connected to said computers via a network, a management server connected to said computers and said file servers via said network, a backup server connected to said management server off said network, and a storage system connected to said file servers and said management server off said network, with said storage system comprising a plurality of storage devices and a storage controller which controls said plurality of storage devices, wherein:

each of said file servers manages a respective file system having a directory structure, stores a first program, and has a first CPU which executes said first program;

said management server manages a file system having a directory structure, stores a second program, and has a second CPU which executes said second program, wherein the file system managed by the management server includes the respective file systems managed by the plurality of file servers;

said second program comprises:

a part for making a request to one of said file servers via said network for information necessary for said management server to back up a file to said backup server as a backup object, said file being stored in said storage system and logically set with a path to said requested file server when said request is made;

said first program comprises:

a part which responds to said request by sending said management server, via said network, an identifier of a second storage device in said storage system that stores duplicate data of said file; and said second program further comprises:

a part which makes a determination, based on said identifier received from the requested file server, whether the requested file server manages the file system having the file to be backed up according to the request;

a part which notifies the requested file server that backup of the file to be backed up will be performed, if the determination is that the requested file server manages the file system having the file to be backed up;

a part which obtains backup data from said duplicate data from said second storage device off said network, based on said identifier; and a part which sends the obtained backup data to said backup server off said network.

2. A computer system according to claim 1, wherein:

said second program further comprises a part which sets the management server with a path to said second storage device off said network, based on said identifier.

3. A computer system according to claim 1, wherein:

said file is stored in a first storage device in said storage system; and said first program further comprises a part which inhibits write into said file in said first storage device while said file is being duplicated to said second storage device, and which writes inhibited data, waiting to be written into said file, into said first storage device while said file is being duplicated.

4. A computer system according to claim 1, wherein:

said first program further comprises:

a part which sends said storage system an ID of a port connected to said second storage device; and a part which receives the identifier of said second storage device, with said identifier being sent by said storage system in response to receipt of said ID.

5. A computer system according to claim 1, wherein:

said request includes a directory name of the backup object.

6. A management server connected to a plurality of computers and a plurality of file servers via a network, and off said network to a backup server and a storage system that comprises a plurality of storage devices and a storage controller for controlling said plurality of storage devices, wherein:

said management server manages a file system having a directory structure, stores a program, and has a CPU which executes said program, wherein the file system managed by the management server includes respective file systems managed by the plurality of file servers; and said program comprises:

a part which makes a request to one of said file servers via said network for information necessary for said management server to back up a file to said backup server as a backup object, said file being stored in said storage system and set with a path to said requested file server when said request is made;

a part which receives, via said network, an identifier of a second storage device in said storage system that stores duplicate data of said file, from said requested file server;

a part which makes a determination, based on said identifier received from the requested file server, whether the requested file server manages the file system having the file to be backed up according to the request;

a part which notifies the requested file server that backup of the file to be backed up will be performed, if the determination is that the requested file server manages the file system having the file to be backed up;

a part which obtains backup data from said duplicate data from said second storage device off said network, based on said identifier; and a part which sends the obtained backup data to said backup server.

7. A management server according to claim 6, wherein:

said second program further comprises a part which sets the management server with a path to said second storage device off said network, based on said identifier.

8. A management server according to claim 6, wherein:

said request includes a directory name of the backup object.

9. A backup method for performing backup in a computer system comprising a plurality of computers, a plurality of file servers connected to said computers via a network, a management server connected to said computers and said file servers via said network, a backup server connected to said management server off said network, and a storage system connected to said file servers and said management server off said network, with said storage system comprising a plurality of storage devices and a storage controller which controls said plurality of storage devices, each of said file servers managing a respective file system having a directory structure, said management server having a file system having a directory structure, and the file system managed by the management server including the respective file systems managed by the plurality of file servers, wherein:

said management server makes a request, via said network, to one of said file servers for information necessary for said management server to back up a file to said backup server as a backup object, said file being stored in said storage system and set with a path to said requested file server when said request is made;

said requested file server sends an identifier, via said network, of a second storage device in said storage system that stores duplicate data of said file, in response to said request;

said management server makes a determination, based on said identifier received from the requested file server, whether the requested file server manages the file system having the file to be backed up according to the request:

said management server notifies the requested file server that backup of the file to be backed up will be performed, if the determination is that the requested file server manages the file system having the file to be backed up;

said management server obtains backup data from said duplicate data from said second storage device off said network, based on said identifier; and said management server sends the obtained backup data to said backup server.

10. A backup method according to claim 9, wherein:

said management server sets the management server with a path to said second storage device off said network, based on said identifier.

11. A backup method according to claim 9, wherein:

said requested file server inhibits write into said file, and writes inhibited data, waiting to be written into said file, into a first storage device in said storage system in which said file is stored, while said file is being duplicated.

12. A backup method according to claim 9, wherein:

said requested file server sends said storage system an ID of a port connected to said second storage device, and receives the identifier of said second storage device, with said identifier being sent by said storage system in response to receipt of said ID.

13. A backup method according to claim 9, wherein:

said request includes a directory name of the backup object.

* * * * *